April 27, 1948.  M. M. LEVY  2,440,283
BALANCING OF ELECTRICAL BRIDGE CIRCUITS CONTAINING NON-LINEAR ELEMENTS
Filed Nov. 20, 1943     3 Sheets-Sheet 1
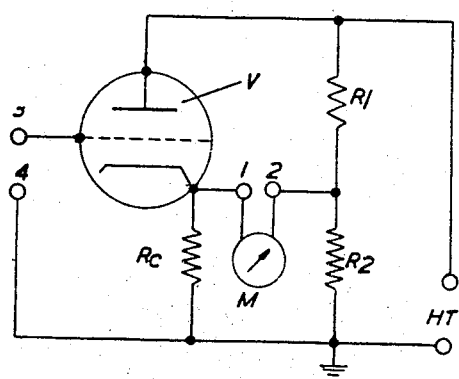
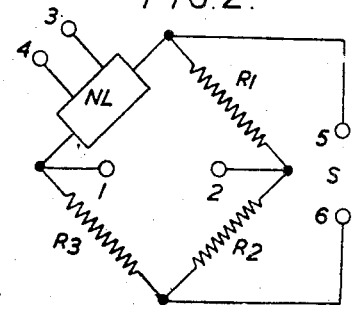
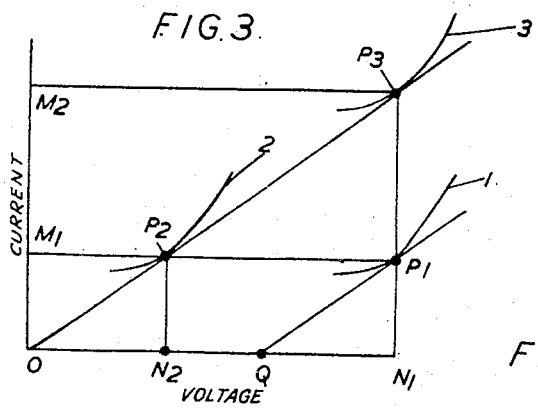
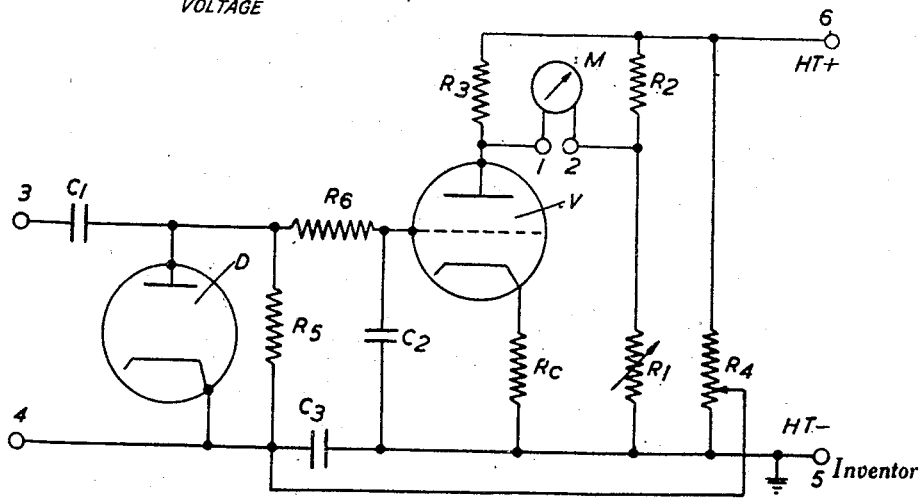
Inventor
Maurice Moïse Levy.
By
Edward T. Finney
Attorney April 27, 1948.  M. M. LEVY  2,440,283
BALANCING OF ELECTRICAL BRIDGE CIRCUITS CONTAINING NON-LINEAR ELEMENTS
Filed Nov. 20, 1943  3 Sheets-Sheet 2
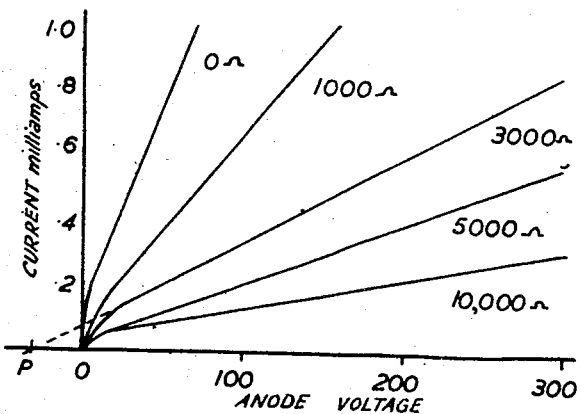
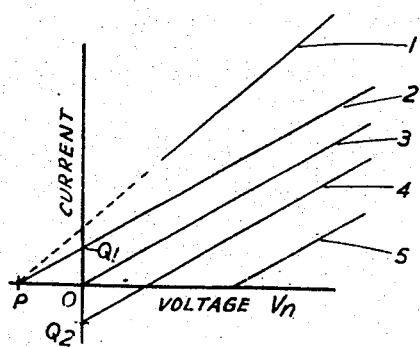
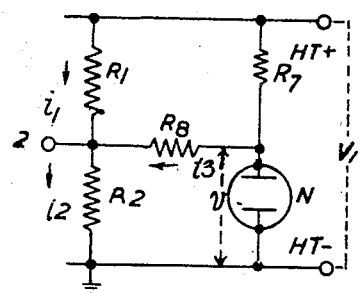
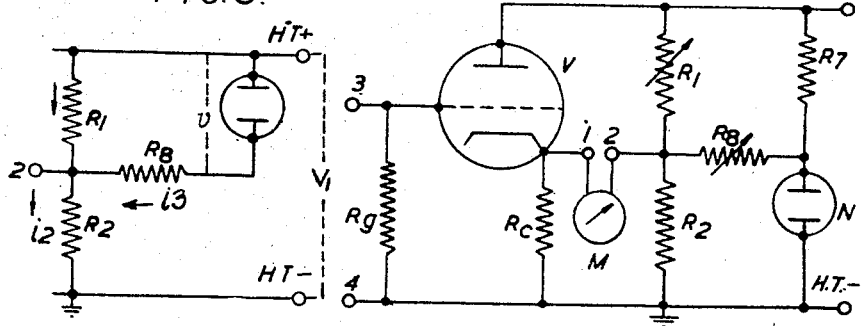
Inventor
Maurice Moise Levy
By Edward D. Kinney
Attorney April 27, 1948.  M. M. LEVY  2,440,283

BALANCING OF ELECTRICAL BRIDGE CIRCUITS CONTAINING NON-LINEAR ELEMENTS

Filed Nov. 20, 1943   3 Sheets-Sheet 3

Inventor
Maurice Moise Levy
By
Edward W. Kinney
Attorney

Patented Apr. 27, 1948

2,440,283

UNITED STATES PATENT OFFICE 2,440,283

BALANCING OF ELECTRICAL BRIDGE CIRCUITS CONTAINING NONLINEAR ELEMENTS

Maurice Moise Levy, London, England, assignor, by mesne assignments, to International Standard Electric Corporation, New York, N. Y., a corporation of Delaware Application November 20, 1943, Serial No. 511,105
In Great Britain April 5, 1943

9 Claims. (Cl. 323—75)

The present invention relates to electrical bridge circuits containing non-linear impedance devices and concerns methods of maintaining the balance of such circuits under varying power supply conditions.

The invention is of particular application to thermionic valve voltmeters and similar types of apparatus though the same principles are applicable over a wider field, as will be pointed out later on.

In valve voltmeters, the anode impedance of a triode valve forms one arm of a Wheatstone bridge, the other arms of which are usually ordinary resistances. The anode voltage supply is connected to one pair of diagonals of the bridge, and an indicating instrument to the other pair. A voltage to be measured is applied to the control grid of the valve, and the resistances are commonly adjusted so that when the applied grid voltage is zero, there is no current through the instrument. It is found, however, that the zero adjustment is very sensitive to changes in the voltage of the anode supply, so that the indications are likely to be variable, and the apparatus requires constant re-adjustment. The reason for this is that the anode impedance of the valve is a non-linear resistance, for which Ohm's law does not hold, and the bridge accordingly goes out of balance when the anode supply voltage changes.

A similar difficulty arises with any other kind of non-linear impedance device (such as a rectifier or semi-conducting resistance) which forms part of a bridge circuit which is required to remain balanced under some specified condition, when the operating source is subject to variations. It will be understood that the valve voltmeter is only one example of such an arrangement. The object of the invention is to compensate for the effects of changes in the operating source or sources or the like, so that the bridge circuit does not become unbalanced as a result of the properties of the non-linear device.

According to the invention, there is provided an electrical Wheatstone bridge circuit having a non-linear impedance device in one of the arms, a source of operating voltage applied to one pair of diagonal points, and means for biasing the non-linear device in such manner that the bridge remains balanced while the operating voltage varies over a given range.

According to another aspect, the invention provides an electrical Wheatstone bridge circuit in which one arm includes a non-linear impedance device and another includes an ordinary resistance, a source of operating voltage being applied to one pair of diagonal points of the bridge, comprising means for biasing the resistance whereby it acquires non-linear properties of such a nature that when the bridge is balanced for a particular value of the operating voltage, it remains balanced when the operating voltage varies over a given range.

According to still another view the invention consists in an electrical circuit arrangement comprising a non-linear impedance device and an ordinary resistance arranged in different arms of a Wheatstone bridge having a source of variable operating voltage applied to one pair of diagonal points, and further comprising biasing means for effectively bringing into substantial coincidence the current-voltage characteristic curves of the non-linear device and of the resistance, after appropriate correction for the bridge ratio, whereby the bridge may be maintained in balance over a given range of variation of the operating voltage.

The invention will be described with reference to the accompanying drawings in which—

Fig. 1 shows a schematic circuit diagram of a known form of thermionic valve voltmeter;

Fig. 2 shows a generalized schematic circuit diagram of a Wheatstone bridge arrangement containing a non-linear impedance device of any type;

Fig. 3 shows a diagram of curves used to explain the principles of the invention;

Fig. 4 shows a schematic circuit diagram of one embodiment of the invention comprising a valve voltmeter;

Fig. 5 shows characteristic curves used to explain the operation of Fig. 4;

Fig. 6 shows further curves used to explain another aspect of the invention;

Figs. 7 and 8 show schematic circuit diagrams of two zero compensating arrangements according to the invention;

Figs. 9, 10 and 11 show schematic circuit diagrams of valve voltmeters compensated according to the invention.

Figure 10:
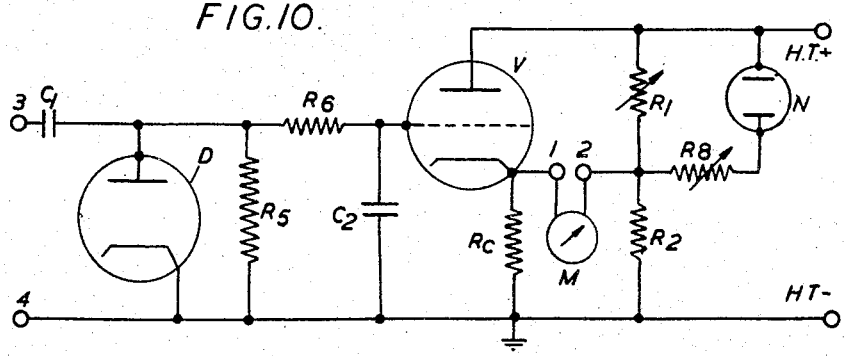

The difficulty which arises in bridge circuits containing non-linear impedance devices will be explained with reference to Fig. 1, which shows in its simplest form the circuit of a commonly used thermionic valve voltmeter. A Wheatstone bridge circuit is made up of three resistances $R_1$, $R_2$, $R_c$, and the anode-cathode impedance of a triode or other type of amplifying valve V, the resistance Rc being in series with the cathode. A direct current indicating instrument M is connected to terminals 1 and 2, between the cathode and the junction of resistances R1 and R2, and the anode supply source HT is connected between the anode and the junction of resistances R2 and Rc which is commonly earthed, as shown. The voltage to be measured is applied between the control grid of the valve V and earth, at terminals 3 and 4, and may be derived from an alternating voltage or current by rectifying means (not shown). One of the resistances is usually made adjustable so that when the voltage applied to the control grid is zero (or some other standard value) the bridge may be balanced so that the meter M reads zero (or the adjustment may be made so that the meter gives some other standard reading under the standard condition). When a voltage to be measured is applied to the control grid, the anode-cathode impedance of the valve is changed and the condition of balance of the bridge is altered, so that the meter gives a reading which depends on the applied voltage. It is found, however, that if the voltage of the anode supply source changes, the condition of balance of the bridge is also altered and a large zero error often results. This error can of course be removed by re-adjustment, but this is inconvenient, and may even be inpractical if the supply source continually fluctuates.

It is, of course, possible to provide stabilizing arrangements for the H. T. voltage, but such arrangements are often complicated, bulky and expensive, and may be the cause of great inefficiency owing to the power consumed by the stabilizing means. Alternatively, the resistance R1 may be replaced by a dummy duplicate of the valve which, being subject to the same variations of the H. T. voltage, changes in the same manner and thereby maintains the balance of the bridge. This expedient has the objection of cost and complication, and moreover generally results in a less sensitive arrangement. The invention provides compensation of the effect of variations of the supply voltage either by biassing the valve or other non-linear device in such a way that it substantially obeys Ohm's law over a small portion of the voltage-current characteristic, which is used as the operating portion, or by biassing the resistance R2 so that its effective characteristic curve is similar to that of the non-linear device. This will be explained presently in detail.

Changes in zero are also produced by variations in the cathode heating source, and by progressive changes in the valve itself. These changes are, however, of negligible importance, so that in practice, only the effects of the variations of the anode supply source need be considered.

To give an idea of the magnitude of the variations produced, in a particular valve voltmeter it was found that a 10% change in the anode supply voltage produced a change of zero of the order of a quarter of the total range of the indicating instrument.

Fig. 2 shows in general form the bridge circuit of the valve voltmeter of Fig. 1. The block NL indicates any non-linear impedance device to which a voltage or current or other influencing means may be applied for the purpose of changing its impedance. The valve V of Fig. 1 is one example of such a non-linear device. Resistance R3 corresponds to Rc. The output terminals 1, 2 may be connected to an indicating instrument or to a relay or other utilization device intended to be operated or controlled by voltages or signals applied to the non-linear device at terminals 3, 4. An appropriate source S is connected to terminals 5 and 6 and supplies suitable operating potential for the bridge. The non-linear device NL may be controlled by an electric signal current or voltage applied at terminals 3 and 4 by which its resistance is varied in accordance with the signal. Because the impedance of the device NL is non-linear, it will be changed when the voltage of the source S changes so that the effect produced by the signal on any device connected to the terminals 1 and 2 is interfered with.

It is desirable to give at this stage another example of a non-linear device which would be subject to the same difficulties as a valve. Resistance elements known as thermistors are coming into extensive use at the present time. These elements are composed of semi-conducting materials such as silver sulphide (and others) which have a very large temperature coefficient of resistance. Such an element is frequently provided with an insulated heating coil intended to be supplied with a control current which may be independent of the current which flows through the resistance element, and the combination is then known as an indirectly heated thermistor. Such a thermistor will be heated and its resistance changed by the current in the heating coil and also by the current flowing through the resistance element. An indirectly heated thermistor may be used as the device NL in Fig. 2 with the resistance element connected in the bridge arm, the heating coil being connected to the terminals 3 and 4 so that a controlling signal current may be supplied thereto. Under some standard condition of the signal current the bridge can be balanced by suitable adjustment of one of the other resistances, but this balance will be destroyed if the voltage of the source S varies, since the change of current through the thermistor will change its resistance.

It is to be noted, also, that since a thermistor is primarily affected by temperature changes it can be used as a thermometer; and when connected in a bridge such as Fig. 2 having a current indicating instrument connected to terminals 1 and 2 the temperature may be read directly on the instrument, and the arrangement will be extremely sensitive. The accuracy of the method depends on the bridge remaining balanced if the applied voltage varies, and this provides another instance of the application of the invention. It will be seen that in this case the "signal" or influence applied to the thermistor is a change of temperature rather than an electric current or voltage.

Referring again to Fig. 2, in which the non-linear device NL is of some type not yet specified, the characteristic curve which gives the relation between the current and voltage for the device may take various forms, and Fig. 3, curve 1, shows a portion of such a curve.

If the element is operated in the neighbourhood of the point $P_1$ for a very short distance on either side of the point, then the operating portion of the curve is substantially the same as the tangent $QP_1$ at the point $P_1$. The effective resistance of the element at the point $P_1$ is equal to $$\frac{ON_1}{P_1N_1}$$

which is not the same as the reciprocal of the slope of the tangent, and accordingly the effective resistance will vary as the operation point moves along the curve, even though its movements remain small. If, however, the curve can be effectively shifted so that the tangent at the operating point passes through the origin O, then the effective resistance will remain substantially constant for small excursions of the operating point. This may be done either by applying to the element a biassing voltage equal to QO so that the characteristic curve 1 moves parallel to the voltage axis to the curve 2, or by applying a biassing current equal to $M_1M_2$ so that the characteristic curve moves upwards parallel to the current axis to the curve 3. In either case the tangent at the operating point $P_2$ or $P_3$ now passes through the origin O. Which of these two methods should be used depends on the nature of the non-linear element and on the associated circuits.

It will be obvious that the same requirement could be met by applying simultaneous voltage and current bias of such amount that the characteristic curve is moved so that it touches the line $OP_2P_3$ at any other point.

It is to be noted that the characteristic curve of the device might be shifted in other ways, that is, not necessarily by means of an applied voltage or current. For example, if the non-linear device is a thermistor, the shift might be obtained by applying heat to it in some other way, for example by placing it in an enclosure the temperature of which is independently controlled. Any appropriate means of influencing the characteristic of the non-linear device curve may thus be employed.

While the characteristic of a non-linear device is in general curved, yet a device may have substantially a straight line characteristic such as $QP_1$ which does not pass through the origin, so that it does not obey Ohm's law. The term "non-linear impedance device" will accordingly be used to include a device which has a straight line characteristic of this kind, and which will be subject to the defects which it is the purpose of this invention to remedy. Thus for the purposes of this specification, a "non-linear impedance device" is defined as one which does not obey Ohm's law.

It will be understood that if the non-linear device is biased in the manner described so that the tangent at the operating point of the characteristic curve passes through the origin O, then the effective resistance will be substantially independent of the voltage of the source S and the bridge will remain balanced.

When the bridge is balanced, $R_1/R_2$ must be equal to $R_0/R_3$, where $R_0$ is the effective resistance of the non-linear device. Unless $R_2=R_3$ the characteristic curves of $R_0$ and $R_1$ will have different slopes, when the bridge is balanced. It will however be convenient to consider the resistances $R_0$ and $R_1$ as though $R_2=R_3$, and accordingly the slope of the characteristic of resistance $R_1$ (or $R_0$) when compared with that of $R_0$ (or $R_1$) will be called the "corrected slope" that is, corrected for the bridge ratio, so that the slope of one resistance will be said to be equal to the corrected slope of another. Likewise the characteristic will be referred to as the "corrected characteristic."

In Fig. 4 is shown the circuit of a valve voltmeter incorporating arrangements according to the invention of the kind just described. It is adapted for measuring alternating voltages and includes a rectifying arrangement for deriving the voltage which is applied to the control grid of the valve.

In Fig. 4, the bridge circuit comprises the resistances $R_1$, $R_2$ and $R_3$ which correspond to those of Fig. 2, and the valve V together with its cathode resistance $R_c$, which corresponds to the non-linear device NL. A direct current measuring instrument M is connected to the bridge terminals 1, 2 and the high tension supply source corresponds to the source S. An alternating voltage to be measured is applied at the terminals 3 and 4 to a diode D (or other rectifying device) through a blocking condenser $C_1$ and the rectified voltage across the load $R_5$ is smoothed by means of the resistance $R_6$ and condenser $C_2$ and is applied to the control grid of the valve V which is given an appropriate positive bias by the connection shown between the resistance $R_5$ and an adjustable tap on the resistance $R_4$ connected across the H. T. source a by-pass condenser $C_3$ being provided.

In Fig. 5 are shown some curves relating the anode potential of the valve V to the current through the resistance $R_c$ when the grid is maintained at earth potential. Curves are given for several different values of $R_c$ as indicated. The valve V to which the curves of Fig. 5 apply is a triode having the characteristic curves given in Fig. 12, which shows the relation between the anode current and voltage for various values of the grid voltage with respect to the cathode. It will be noted that the curves of Fig. 5 are substantially straight lines except very near the origin, and if these straight lines were produced backwards they would cut the voltage axis at points on the negative side of the current axis. The curve for $R_c=3000$ ohms has been produced backwards by the dotted line to indicate this, and meets the voltage axis at the point P. It can easily be shown that when the grid potential is changed negatively the curves are all substantially translated to the right parallel to the voltage axis. Thus by appropriate choice of the grid voltage, the 3000 ohm line, for example, may be made to pass through the origin O. In this particular case a potential of $-0.3$ volt on the grid would be required to do this. By use of this grid potential, the effective resistance of the valve together with the cathode resistance $R_c$ will be substantially independent of the anode voltage, and therefore independent of the voltage of the high tension source. Any of the curves of Fig. 5 may be similarly shifted by an appropriate choice of the grid potential.

Referring to Fig. 4, when no alternating voltage is applied to the diode D, there will be a small current in the resistance $R_5$ which will bias the control grid of the valve V negatively. It will probably be found that this bias is more than is required to shift the characteristic curve in the desired manner. For this reason the adjustable resistance $R_4$ is provided, whereby an appropriate counteracting positive bias may be applied to the grid.

In setting the circuit, the resistance $R_1$ is first adjusted until some reading is produced on the meter M which remains constant while the high tension voltage is changed. This adjustment makes the corrected slope of the characteristic of $R_1$ equal to the slope of the relevant characteristic curve of Fig. 5. The proper high tension voltage is then applied and the grid bias is adjusted by means of the tapping on the resistance $R_4$ until this meter reading is reduced to zero. This shifts the characteristic of Fig. 5 until it substantially coincides with the corrected characteristic of the resistance $R_1$. It will then be found that the reading of the indicating meter M corresponding to an alternating voltage applied at terminals 3 and 4 is practically unaffected by changes in the high tension voltage.

It will be evident that any other suitable known arrangement for adjusting the grid bias may be used instead of the one shown in Fig. 4.

This circuit has been found to give good results in practice, but its scope is limited. The sensitivity desired is obtained by suitably selecting $R_c$, and the high tension voltage being given, the plate current of the valve is then determined at the value indicated by the appropriate curve of Fig. 5 as shifted, which value may be too small. For this reason an alternative method of proceeding according to the invention is preferred. The arrangement is then substantially the same as Fig. 1 except that the resistance $R_2$ is made to behave like a non-linear device with a characteristic similar to that of the valve, so that the bridge remains balanced when the high tension voltage is changed.

Referring again to Fig. 1, in order that the meter M shall show no deflection as the HT voltage varies, the potential drop across the resistances $R_c$ and $R_2$ must be the same at all times. The curves of Fig. 5 show the relation between the anode voltage and the anode current I for the valve V and resistance $R_c$, as already explained. The potential drop across the resistance $R_c$ will be $IR_c$, and if there is to be no current in the meter M, then the current in $R_2$ must be $IR_c/R_2$ however the HT voltage may vary. If the curve for $R_c = 3000$ ohms be taken as an example, this means that the relation between the current and the HT voltage for the resistance $R_2$ must be represented by a line which passes through the point P but which has a slope less than that of the 3000 ohm line in the ratio $R_2/R_c$; in other words the slope must be corrected for the bridge ratio.

In Fig. 6, line I shows as an example the working portion of the 3000 ohm characteristic redrawn to different scales, and produced backwards to meet the voltage axis in the point P as before. Curve 2 shows the characteristic required for the resistance $R_2$ passing through the point P and having a smaller slope, it being assumed, for example, that $R_2$ is greater than $R_c$. Curve 3 shows the normal characteristic for the resistance $R_2$ which passes through the origin O, it being remembered that the voltage scale refers to the voltage applied to the diagonal points of the bridge and not to the voltage at the terminals of $R_2$. Since curve 2 is the desired characteristic for the resistance $R_2$, it is necessary by some means effectively to shift the curve 3 upwards into coincidence with curve 2.

It will be remembered in connection with Fig. 4, that the diode D applies a negative bias to the control grid of the valve V, which has the effect of shifting all the curves of Fig. 5 to the right so that they intersect the voltage axis on the positive side of the current axis. In cases like this, the characteristic desired for $R_2$ would be similar to the line 4 of Fig. 6, requiring the characteristic 3 to be shifted downwards instead of upwards.

It will be seen that the current corresponding to any point on line 2 is the sum of two currents, the first of which is proportional to the applied voltage and is given by the line 3, and the second of which is constant and given by the length $OQ_1$. Similarly in the case of line 4, the current is the difference between the current represented by the line 3 and a constant current $OQ_2$.

Figs. 7 and 8 show arrangements according to the invention for shifting the characteristic line 3 upwards and downwards respectively. This result is accomplished particularly by impressing a substantially fixed current differential in the linear impedance. Referring to Fig. 7, the resistances $R_1$ and $R_2$ are shown connected across the high tension supply as in Fig. 1. A neon tube N (or other gas filled tube or like device) is connected in series with a resistance $R_7$ across the high tension supply, the tube being connected to the negative terminal, and the junction point is connected to terminal 2 through the resistance $R_8$. The neon tube acts so that a constant potential is applied to the resistance $R_8$ which is independent of the variations of the high tension voltage.

Fig. 8 shows the arrangement for shifting the characteristic line downwards. It differs from Fig. 7 in that the resistance $R_7$ is omitted, and that the neon lamp is connected in place of it to the positive terminal of the HT supply. In Figs. 7 and 8, let $i_1$, $i_2$ and $i_3$ be the current flowing in the resistances $R_1$, $R_2$ and $R_3$ respectively as shown. Let $V_1$ be the high tension voltage, and $v$ the constant voltage maintained by the neon tube N. Then it is easily shown that for Fig. 7

$$V_1 = i_2(R_1R_2 + R_1R_8 + R_2R_8)/R_8 - vR_1/R_8$$

and for Fig. 8

$$V_1 = i_2(R_1R_2 + R_1R_8 + R_2R_8)/(R_1 + R_8) + vR_1/(R_1 + R_8)$$

Since the term in $v$ is constant, and of opposite signs in these two expressions, it will be evident that the relation between $V_1$ and $i_2$ corresponds to the line 2 of Fig. 6 in the case of Fig. 7 and to the line 4 in the case of Fig. 8. Preferably $R_2$ should be chosen to be small compared with $R_1$ and $R_8$ in which case the two expressions reduce approximately to $$V = R_1 i_2 - vR_1/R_8$$

for Fig. 7, and $$V = R_1 R_8 i_2/(R_1 + R_8) + vR_1/(R_1 + R_8)$$

for Fig. 8. Thus in the case of Fig. 7, $R_1$ may be adjusted to obtain the desired slope for the line 2, and $R_8$ may then be adjusted independently so that the intercept OQ has the desired value. Unfortunately in the case of Fig. 8, the adjustments of $R_1$ and $R_8$ can no longer be independent and the necessary setting is more troublesome to obtain. For this reason, as will be explained later, it is preferable to employ the arrangement of Fig. 7 together with a grid biassing potentiometer similar to that shown in Fig. 4.

It may be pointed out that in Fig. 8 it is possible to omit $R_8$ altogether, so that the neon tube N is connected direct to terminal 2. The curve 5 of Fig. 6 is in this case produced, and this curve cuts the voltage axis at the fixed point $V_n$ where $OV_n$ is the voltage required to maintain the discharge of the tube. In other words for a given neon tube, the curve 5 is fixed, and it would then be necessary to apply appropriate bias to the control grid of the valve so that the curve 4 is moved into coincidence with curve 5.

It will be understood that if necessary, two or more neon or other gas filled tubes may be used in series if one tube does not provide a large enough constant voltage to produce the current $i_3$.

It will be appreciated that in the arrangements of Figs. 7 and 8 the resistance $R_2$ has been given the properties of a non-linear impedance device as defined in this specification.

Fig. 9 shows a complete circuit similar to Fig. 1 provided with zero balancing arrangements according to Fig. 7. The control grid of the valve V is connected to earth through a grid resistance $R_g$, so that in the absence of any voltage applied to the terminals 3 and 4 it will be substantially at earth potential, and the curves of Fig. 5 therefore apply. The various other elements are given the same designations as in Figs. 1 and 7. In making the zero settings, the resistance $R_3$ is first set at some value in order to get a meter deflection, and $R_1$ is then adjusted so that when no voltage is applied at terminals 3 and 4 the meter M gives some reading which does not vary when the voltage of the HT supply is changed. This gets the slope of the curve 2 (Fig. 6) correct. The resistance $R_3$ is then adjusted until the meter reads zero. This shifts the curve to the desired position.

Figure 12:
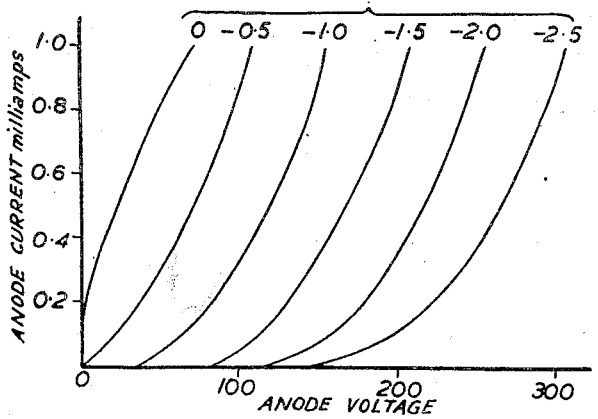
Fig. 12 shows typical characteristic curves for a valve which is suitable for use in the embodiment of the invention.

In a particular case of this circuit the following components were used:

*Valve V.*—Typical characteristic curves are shown in Fig. 12.

$R_c$=2,000 ohms
$R_1$=63,000 ohms (variable)
$R_2$=400 ohms
$R_7$=55,000 ohms
$R_3$=100,000 ohms (variable).

*Meter M.*—Range 0-200 microamperes.

*Neon tube.*—Stabilising voltage about 70 volts.

With this arrangement in proper adjustment, a full scale deflection on the meter M (200 microamperes) was produced when a potential of —0.25 volt was applied to the control grid of the valve V, and the variation of zero was ±0.3 microampere for a variation of ±50 volts of the H. T. voltage, the average value being 250 volts.

Fig. 10 shows the arrangement of Fig. 8 applied to the circuit when provided with a rectifying diode D as in Fig. 4. In a specific case the components used were the same as in Fig. 9 except $R_1$=93,000 ohms (variable) and $R_3$=180,000 ohms (variable). In addition, $R_5$=$R_6$=1 megohm and $C_2$=0.01 microfarad. The diode D produced a potential of about —1 volt on the grid in the absence of signals applied to terminals 3 and 4. This circuit was adjusted according to the same principles as Fig. 9, but as already explained, the adjustments of $R_1$ and $R_3$ are not independent. For this reason the arrangement of Fig. 11 was preferred. This will be seen to be provided with an adjustable counteracting bias for the control grid obtained from a potentiometer $R_9$, $R_{10}$ shunted across the neon tube N, and the zero balancing arrangement of Fig. 7 is used.

Figure 11:
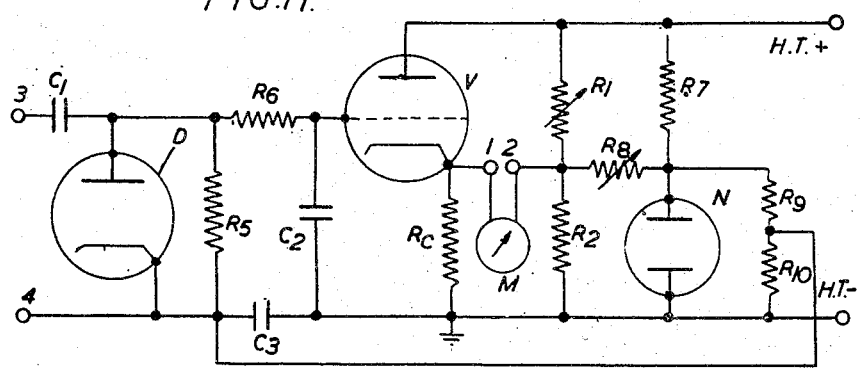

In particular example of the circuit of Fig. 11 the valve V, meter M, neon tube N, and the diode D were as before specified, and the various other elements were as follows:

$R_1$=230,000 ohms (variable)
$R_2$=2,000 ohms
$R_c$=10,000 ohms
$R_7$=70,000 ohms
$R_3$=27,000 ohms (variable)
$R_9$=1 megohm
$R_{10}$=100,000 ohms
$R_5$=10 megohms
$R_6$=2 megohms
$C_2$=0.01 microfarad.

With this arrangement a full scale deflection of the meter M (200 microamperes) was obtained by the application of an alternating potential of 0.6 volt to the terminals 3 and 4, and the zero stability obtained was about ±1 microampere when the high tension voltage was varied ±50 volts from 250 volts. The same voltage variation was found to produce only a 2% variation of sensitivity at full scale deflection. The stability of the calibration of the arrangement is principally due to the high negative feedback produced by the resistances $R_2$ and $R_c$ which have been given larger values than previously for this reason.

Although in the embodiments described triode valves have been shown, it is clear that valves having any number of additional electrodes or grids suitably polarized in known manner, could be used.

It will be understood from the explanations which have been given that the balance of the bridge containing the non-linear device is maintained during variations of the applied voltage either by biassing the non-linear device so that at least over its working range it behaves substantially like an ordinary resistance which obeys Ohm's law, or by biassing one of the bridge resistances so that it behaves like a non-linear device having the characteristics necessary to maintain the balance. In this statement the term "biassing" means the application of a voltage or current or other appropriate influence in such a way that the characteristic curve of the device is effectively shifted with respect to the co-ordinate axes, without being substantially altered in shape. Although the invention has been described in terms of embodiments employing a valve as the non-linear device it will be evident that the same principles are applicable to other kinds of non-linear impedance devices, though the details of the methods of applying the principles will very likely be different. Having given the nature of the non-linear device, it will be evident to those skilled in the art from the explanations which have been given how the principles of the invention should be applied to it.

What is claimed is:

1. A bridge circuit which remains balanced when the operating voltage varies comprising means including a non-linear impedance constituting one bridge arm and a linear impedance in series therewith constituting another arm, a second linear impedance constituting the balancing arm therefor in the bridge, and means for imparting to the second linear impedance a substantially constant current voltage characteristic irrespective of substantial variations in the operating voltage from its normal voltage and substantially equivalent to the characteristics of said non-linear impedance and in accordance with the bridge ratio.

2. A bridge circuit which remains balanced when the operating voltage varies comprising means including a non-linear impedance constituting one bridge arm and a linear impedance in series therewith constituting another arm, a second linear impedance constituting the balancing arm therefor in the bridge, and means for imparting to the second linear impedance a constant current voltage characteristic irrespective of substantial variations in the operating voltage from its normal voltage and substantially equivalent to the characteristics of said non-linear impedance, and means to adjust the current voltage characteristics imparted to said second linear impedance.

3. A bridge circuit which remains balanced when the operating voltage varies comprising means including a non-linear impedance constituting one bridge arm and a linear impedance in series therewith constituting another arm, a second linear impedance constituting the balancing arm therefor in the bridge, and a shunt circuit for impressing a substantially constant current differential on said second linear impedance irrespective of substantial variations in the operating voltage from its normal voltage.

4. A bridge circuit which remains balanced when the operating voltage varies comprising means including a space discharge tube having at least a cathode, anode and control grid constituting one bridge arm and a linear impedance in series therewith constituting another arm of the bridge, a second linear impedance constituting the balancing arm therefor in the bridge, and means for imparting to the second linear impedance a substantially constant current voltage characteristic irrespective of substantial variations in the operating voltage from its normal voltage and substantially equivalent to the characteristics of said non-linear impedance including a voltage stabilizing means, resistance means shunting the voltage stabilizing means, and a connection from the resistance means to the control grid of the space discharge tube.

5. An electrical Wheatstone bridge circuit, in combination, in which one arm includes a non-linear impedance device and another includes an ordinary resistance, a source of operating voltage applied to one pair of diagonal points of the bridge, means connected to the other diagonal points and responsive to a difference in voltage thereacross, and means continuously biassing the resistance with a constant current voltage characteristic corresponding with the non-linear characteristic of the non-linear impedance whereby when the bridge is balanced for a particular value of the operating voltage, it remains balanced when the operating voltage varies over a given range.

6. An electrical Wheatstone bridge circuit, in combination, in which one arm includes a non-linear impedance device and another includes an ordinary resistance, a source of operating voltage applied to one pair of diagonal points of the bridge, means connected to the other pair of diagonal points and responsive to a difference in voltage thereacross, means for continuously biassing the resistance with a constant current bias of such a magnitude that the current voltage characteristic curve of the resistance is effectively shifted into substantial coincidence with the operating portion of the characteristic curve of the non-linear device after correction for the bridge ratio whereby when the bridge is balanced for a particular value of the operating voltage, it remains balanced when the operating voltage varies over a given range.

7. A electrical Wheatstone bridge circuit, in combination, in which one arm includes a non-linear impedance device and another includes an ordinary resistance, a source of operating voltage applied to one pair of diagonal points of the bridge, means connected with the other diagonal points and responsive to a difference in voltage thereacross, means constantly biassing the resistance with a constant current bias of such a magnitude that the current voltage characteristic curve of the resistance is effectively shifted into substantial coincidence with the operating portion of the characteristic curve of the non-linear device after correction for the bridge ratio, including a gas-filled discharge tube connected to the operating voltage source and maintaining a constant voltage which is independent of the variation of the operating voltage whereby when the bridge is balanced for a particular value of the operating voltage, it remains balanced when the operating voltage varies over a given range.

8. An electrical Wheatstone bridge circuit, in combination, in which one arm includes a non-linear impedance device and another includes an ordinary resistance, a source of operating voltage applied to one pair of diagonal points of the bridge, means connected to the other diagonal points and responsive to the difference in voltage thereacross, means for biassing the resistance including a gas filled discharge tube, and a resistance separate from the bridge circuit connected in series therewith, the gas filled tube and separate resistance being connected across the operating voltage source, the resistance being connected to the positive side of said source, and a second resistance connecting the juncture of said tube and said separate resistance to the end of said ordinary resistance which is connected to one of the other diagonal points of said bridge whereby the ordinary resistance acquires non-linear properties of such a nature that when the bridge is balanced for a particular value of the operating voltage, it remains balanced when the operating voltage varies over a given range.

9. An electrical Wheatstone bridge circuit in combination in which one arm includes a non-linear impedance device and another includes an ordinary resistance, a source of operating voltage applied to one pair of diagonal points of the bridge, means connected to the other diagonal points and responsive to a difference in voltage thereacross, and means for biassing the resistance including a gas-filled discharge tube, and a resistance separate from the bridge connected in series therewith, the gas filled tube and separate resistance being connected between the positive side of the operating voltage source and the end of said ordinary resistance connected to one of said diagonal points of said bridge.

MAURICE MOISE LEVY.

REFERENCES CITED

The following references are of record in the file of this patent:

UNITED STATES PATENTS

| Number | Name | Date |
|---|---|---|
| 1,966,047 | Ryall | July 10, 1934 |
| 1,969,518 | Moles | Aug. 7, 1934 |
| 2,008,855 | Drobish | July 23, 1935 |
| 2,147,446 | Koch | Feb. 14, 1939 |
| 2,147,729 | Wurmser | Feb. 21, 1939 |
| 2,190,743 | Vance | Feb. 20, 1940 |
| 2,289,951 | Yeutter | July 14, 1942 |
| 2,305,307 | Wellenstein et al. | Dec. 15, 1942 |
| 2,311,807 | Anderson | Feb. 23, 1943 |